United States Patent [19]

Ly

[11] Patent Number: 5,566,216
[45] Date of Patent: Oct. 15, 1996

[54] TOOL FOR REMOTELY MEASURING WIDTH OF DOWNCOMER ANNULUS IN BOILING WATER REACTOR

[75] Inventor: Khanh T. Ly, San Jose, Calif.

[73] Assignee: General Electric Company, San Jose, Calif.

[21] Appl. No.: 532,946

[22] Filed: Sep. 22, 1995

[51] Int. Cl.[6] ................................................ G21C 17/00
[52] U.S. Cl. .............................. 376/258; 33/708; 33/810; 324/207.22; 324/207.24
[58] Field of Search .................................. 376/258, 249, 376/245; 33/502, 708, 810, 827, 833; 324/207.22, 207.24, 207.11

[56] References Cited

U.S. PATENT DOCUMENTS

| | | | |
|---|---|---|---|
| 2,847,764 | 8/1958 | Schaerer | 33/827 |
| 2,952,076 | 9/1960 | Gross | 33/827 |
| 3,084,541 | 4/1963 | Rouge | 376/258 |
| 5,488,782 | 2/1996 | Ochiai | 33/708 |

Primary Examiner—Daniel D. Wasil
Attorney, Agent, or Firm—James E. McGinness

[57] ABSTRACT

A tool which can be remotely operated to precisely measure the downcomer annulus width at the elevation of the top guide support ring. The measuring tool has a support frame adapted to be grappled and then hooked onto the upper rim of the shroud, and a measuring subassembly mounted on the support frame. The measuring subassembly has a contact block mounted on a bearing-mounted slider. The slider is translatable between a retracted (i.e., "home") position and an extended position in response to actuation of a cylinder mounted on the support frame. When the tool is properly installed on the rim of the shroud, the slider travels radially outward in response to actuation of the cylinder until the contact block abuts the opposing inner surface of the reactor pressure vessel wall, i.e., the slider is stopped. The measuring subassembly further includes a magnetic position transducer which produces electrical signals which are function of the distance traveled by the slider from the "home" position to the "stop" position.

20 Claims, 9 Drawing Sheets

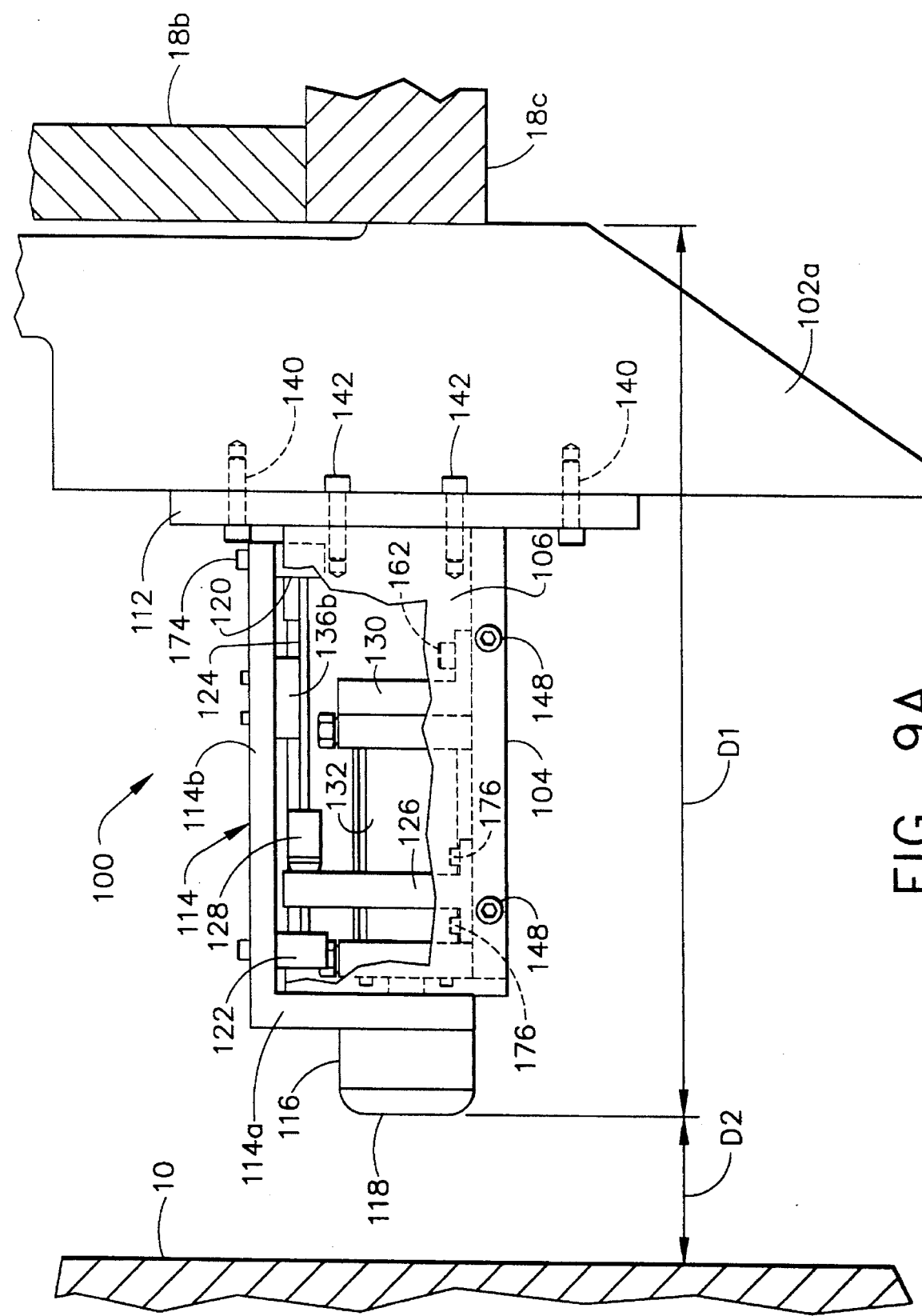

TOOL FOR REMOTELY MEASURING WIDTH OF DOWNCOMER ANNULUS IN BOILING WATER REACTOR

FIELD OF THE INVENTION

This invention relates to tooling which is useful in installing hardware in a nuclear reactor. In particular, the invention relates to tooling for installing hardware for stabilizing the core shroud of a nuclear reactor to resist deflection in response to a seismic event and/or loss-of-coolant accident (LOCA).

BACKGROUND OF THE INVENTION

A conventional boiling water reactor is shown in FIG. 1. Feedwater is admitted into a reactor pressure vessel (RPV) 10 via a feedwater inlet 12 and a feed-water sparger 14, which is a ring-shaped pipe having suitable apertures for circumferentially distributing the feed-water inside the RPV. The feedwater from sparger 14 flows downwardly through the downcomer annulus 16, which is an annular region between RPV 10 and core shroud 18.

Core shroud 18 is a stainless steel cylinder surrounding the nuclear fuel core 20. Core 20 is made up of a plurality of fuel bundle assemblies 22 (only two 2×2 arrays of which are shown in FIG. 1). Each array of fuel bundle assemblies is supported at the top by a top guide 19 and at the bottom by a core plate 21. The core top guide provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Vertical stand-pipes 30 atop shroud head 28 are in fluid communication with core upper plenum 26. The steam-water mixture flows through standpipes 30 and enters steam separators 32. The separated liquid water then mixes with feed-water in the mixing plenum 33, which mixture then returns to the core via the downcomer annulus. The steam passes through steam dryers 34 and enters steam dome 36. The steam is conducted from the RPV via steam outlet 38.

The BWR also includes a coolant recirculation system which provides the forced convection flow through the core necessary to attain the required power density. A portion of the water is pumped from the lower end of the downcomer annulus 16 via recirculation water outlet 42 and forced by a centrifugal recirculation pump (not shown) into jet pump assemblies 44 (only one of which is shown) via recirculation water inlets 46. The BWR has two recirculation pumps, each of which provides the driving flow for a plurality of jet pump assemblies. The jet pump assemblies are circumferentially distributed around the core shroud 18.

The core shroud 18 (see FIG. 2) comprises a shroud flange 18a for supporting the shroud head 28; a circular cylindrical upper shroud wall 18b having a top end welded to shroud flange 18a; an annular top guide support ring 18c welded to the bottom end of upper shroud wall 18b; a circular cylindrical middle shroud wall comprising three sections 18d, 18e and 18f welded in series, with a top end of section 18d being welded to top guide support ring 18c; and an annular core plate support ring 18g welded to the bottom end of middle shroud wall section 18f and to the top end of a lower shroud wall 18h. The entire shroud is supported by a shroud support 50, which is welded to the bottom of lower shroud wall 18h, and by annular shroud support plate 52, which is welded at its inner diameter to shroud support 50 and at its outer diameter to RPV 10.

In the event of a seismic disturbance, it is conceivable that the ground motion will be translated into lateral deflection relative to the reactor pressure vessel of those portions of the shroud located at elevations above shroud support plate 52. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 18, which vertically and horizontally supports core top guide 19 and shroud head 28. In particular, a cracked shroud increases the risks posed by a loss-of-coolant accident (LOCA). During a LOCA, the loss of coolant from the reactor pressure vessel produces a loss of pressure above the shroud head 28 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

A known repair method for vertically restraining a weakened core shroud utilizes tensioned tie rods coupled to the shroud flange and to the shroud support plate. In addition, the shroud is restrained laterally by installation of wishbone springs which, along with the tie rod, are components of the shroud repair assembly. This shroud repair apparatus is shown in FIG. 2.

Referring to FIG. 2, a shroud restraint tie rod assembly comprises a tie rod 54 having a circular cross section. A lower end of tie rod 54 is anchored in a threaded bore formed in the end of a spring arm 56a of a lower spring 56. Tie rod 54 extends from the end of spring arm 56a to a position adjacent the outer circumferential surface of the top guide support ring 18c. The upper end of tie rod 54 has a threaded portion.

The lower spring 56 is anchored to a gusset plate 58 attached to the shroud support plate 52. The lower spring 56 has a slotted end which straddles gusset plate 58 and forms a clevis hook 56c. The clevis hooks under opposite ends of a clevis pin 60 inserted through a hole machined in the gusset plate 58. Engagement of the slotted end with the gusset plate 58 maintains alignment of lower spring 56 under the action of seismic motion of the shroud, which may be oblique to the spring's radial orientation.

The tie rod 54 is supported at its top end by an upper support assembly 62 (shown in greater detail in FIG. 4) which hangs on the shroud flange 18a. A pair of notches or slots are machined in the shroud head ring 28a of shroud head 28. The notches are positioned in alignment with a pair of bolted upper support plate segments 64 of the upper support assembly when the shroud head 28 is properly seated on the top surface of shroud flange 18a. These notches facilitate coupling of the tie rod assembly to the shroud flange.

The pair of notches at each tie rod azimuthal position receive respective hook portions 64a of the upper support plates 64. As best seen in FIG. 4, each hook 64a conforms to the shape of the top surface of shroud flange 18a and the shape of the steam dam 29. The distal end of hook 64a hooks on the inner circumference of steam dam 29.

Referring to FIGS. 3 and 4, the upper support plates 64 are connected in parallel by a top support bracket 65 and a support block 66 which forms the anchor point for the top of the tie rod. Support block 66 has an unthreaded bore 68, tapered at both ends, which receives the upper end of tie rod 54. After the upper end of tie rod 54 is passed through bore 68, a threaded nut 70 is screwed onto the threaded end of tie rod 54.

The assembly comprised of support plates 64 with hooks 64a, support block 66, tie rod 54, lower spring 56, clevis pin 60 and gusset plate 58 form a vertical load path by which the shroud flange 18ais connected to the shroud support plate 52. In the tensioned state, upper support plates 64 exert a restraining force on the top surface of the shroud flange 18awhich opposes separation of the shroud at any assumed failed circumferential weld location.

Referring to FIG. 5, the upper restraint spring 72 is a double cantilever "wishbone" design, to react the lateral seismic loads without adding bending load on the top support. The end of one arm 72a of spring 72 has an axle mounting (not shown) which is rotatably mounted in an unthreaded bore formed in an upper spring bracket 74. This allows the spring to rotate relative to the upper spring bracket 74. The end of the other arm 72b has an upper contact spacer 86 rotatably mounted there on. Upper contact spacer 86 is designed to bear against the inner surface of the reactor pressure vessel wall. The contacting face of upper contact spacer 86 must be machined prior to its installation in dependence on the width of the downcomer annulus measured along a radius which intersects upper contact spacer 86.

The upper spring bracket 74 has a pair of parallel linear projections 76 (see FIG. 5) which slide in corresponding grooves 78 (see FIG. 4), formed on opposing surfaces of upper support plates 64, during installation of the upper spring assembly. Grooves 78 are oriented at an acute angle (e.g., 5°) relative to the vertical axis of the vessel inside surface. In addition, the upper spring assembly comprises a jack bolt 80 which passes through an unthreaded bore in the upper spring bracket 74. Longitudinal displacement of jack bolt 80 relative to upper spring bracket 74 is prevented by a shoulder under the head of jack bolt 80 to rotate freely relative to upper spring bracket 74. A threaded end of jack bolt 80 projects beyond the upper spring bracket and is screwed into a threaded bore 82 in the support block 66. Threaded bore 82 is disposed parallel to grooves 78 in the upper support plates 64. Thus, as the jack bolt is rotated, the upper spring bracket 74 and upper spring 72 coupled thereto translate in parallel with grooves 78 until the upper contact spacer 86 on arm 72b is wedged against the inner surface of the reactor pressure vessel wall. The upper spring assembly is installed with enough elastic preload to prevent mechanical wear of its parts due to reactor vibration.

The upper spring 72 is installed with a desired preload against the wall of vessel 10. The amount of preload is a function of the distance which jack bolt 80 travels along bore 82 in support block 66. This mounting allows simple installation and subsequent removal, if required for reactor servicing access. When the desired amount of preload has been attained, the jack bolt is locked against further rotation relative to upper spring bracket 74 by a latching mechanism (not shown).

Lateral restraint at the elevation of the core guide support ring 18g is provided by a lower spring 56 also having a double cantilever "wishbone" design. Referring back to FIG. 2, the spring arm 56a of lower spring 56 laterally supports the shroud 18 at the core plate support ring 18g, against the vessel 10, via a lower contact spacer 88 which bears against the RPV wall. The contacting face of the lower contact spacer 88 must be machined prior to its installation in dependence on the width of the downcomer annulus measured along a radius which intersects lower contact spacer 88. The top end of spring arm 56a has a threaded bore to provided the attachment for the bottom of the tie rod 54. The member 56d connecting the upper wishbone spring 56a, 56b to the clevis hook 56c offset from the line of action between the lower end of tie rod 54 and the clevis pin 60 to provide a vertical spring compliance in the load path to the tie rod.

A middle support 90 is preloaded against the vessel wall at assembly by radial interference which bends the tie rod 54, thereby providing improved resistance to vibratory excitation failure of the tie rod. The contacting faces of the middle support 90 must also be machined prior to installation independence on the annulus width at the middle support location.

In order to produce the desired lateral restraint forces, the upper and lower spring assembly must be dimensioned in precise relationship to the annulus width at the respective elevations of the upper and lower contact spacers 86 and 88. These dimensions must be measured before the shroud repair hardware is installed to ensure proper fit of the components. In particular, the upper and lower contact spacers must be machined in dependence on the measurement results. In addition, the distance separating the tie rod and the reactor pressure vessel at the elevation of the middle support must be known with precision so that the middle support can be correctly dimensioned. Since the downcomer annulus in a boiling water reactor exposed to high radiation fields and inaccessible to maintenance personnel, it is desirable that these dimensions be measured remotely by personnal stationed at a safe distance above the reactor. Thus, there is a need for a remotely operable tool capable of precisely measuring the downcomer annulus width at a predetermined elevation.

SUMMARY OF THE INVENTION

The present invention is a tool which can be remotely operated to precisely measure the downcomer annulus width at a predetermined elevation. In particular, the preferred embodiment of the invention is a tool designed to measure the annulus width at the elevation of the top guide support ring. The measuring tool in accordance with the preferred embodiment has a support frame adapted to be grappled and then hooked onto the upper rim of the shroud, and a measuring subassembly which is mounted on the support frame.

The measuring subassembly of the annulus width measuring tool in accordance with the preferred embodiment comprises a contact block mounted on a bearing-mounted slider. The slider is translatable between a retracted (i.e., "home") position and an extended position in response to actuation of a cylinder mounted on the support frame and having the distal end of its piston connected to the slider. The cylinder may be either pneumatic or hydraulic. When the tool is properly installed on the rim of the shroud, the slider travels radially outward in response to actuation of the cylinder until the contact block abuts the opposing inner surface of the RPV wall, i.e., the slider is stopped.

The measuring subassembly further comprises a magnetic position transducer which produces electrical signals which are function of the distance traveled by the slider from the "home" position to the "stop" position. In accordance with the preferred embodiment, the magnetic position transducer comprises a scale with magnetic graduations and a pair of magnetic flux-responsive multi-gap heads which are slidably coupled to the scale. The scale is fixedly mounted on the slider and the head arrangement is fixedly mounted on the support frame so that the scale translates relative to the heads during slider travel toward the reactor pressure vessel wall. The heads produce electrical signals which are a function of the distance traveled by the scale (i.e., slider) relative to the heads. In particular, the electrical signals can be detected to indicate increments of relative travel. In accordance with the preferred embodiment, the electrical signals from the magnetic position transducer are transduced by a phase system detector to produce a signal output indicating the measured travel distance. The measured travel distance is then added to the known distance separating the end face of the contact block in the "home" position and the tool surface abutting the shroud to arrive at the annulus width at the desired elevation.

BRIEF DESCRIPTION OF THE DRAWINGS

FIG. 9A is a side elevation view of a lower portion of the annulus width measuring tool in accordance with the preferred embodiment of the invention.

DETAILED DESCRIPTION OF THE PREFERRED EMBODIMENTS

Figure 1:
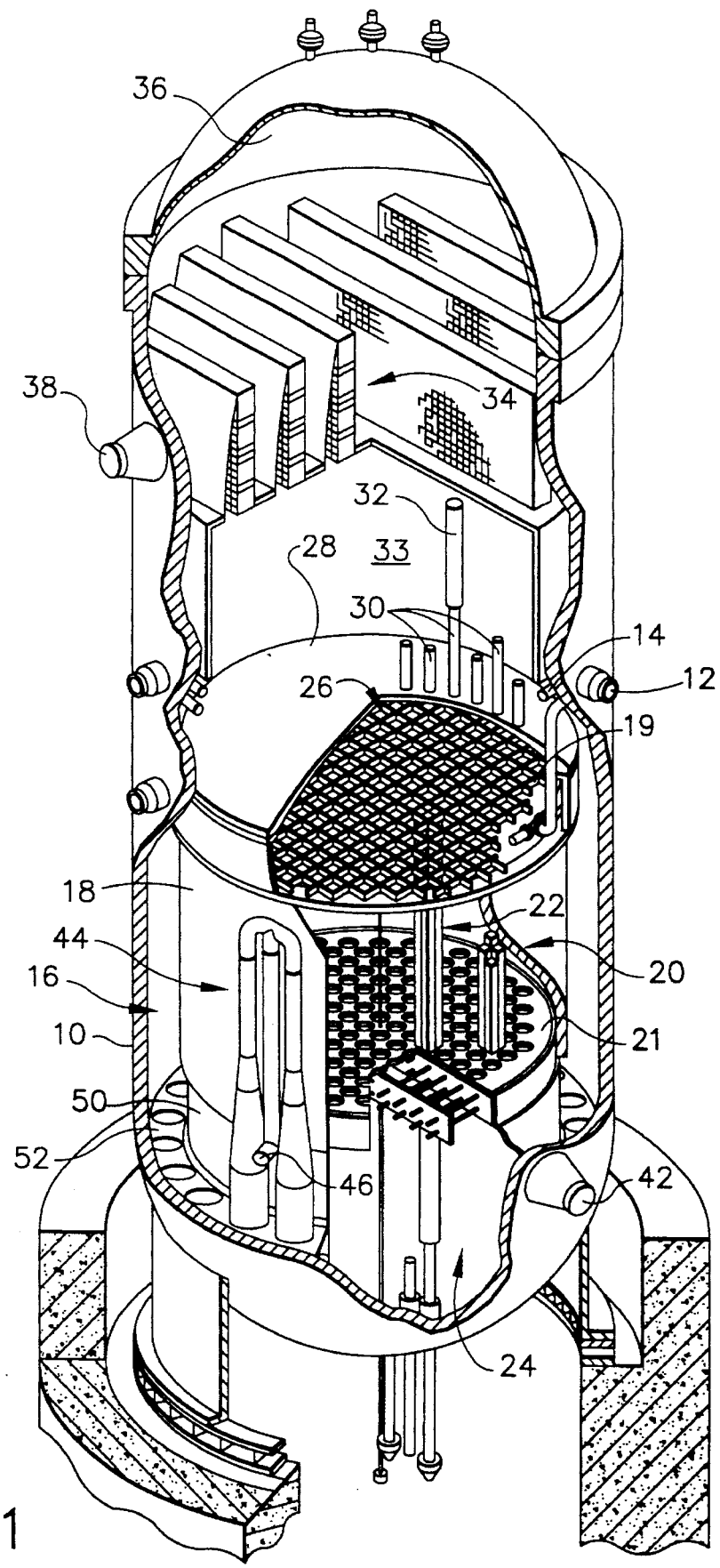
FIG. 1 is a schematic showing a partially cutaway isometric view of a conventional BWR.
Figure 2:
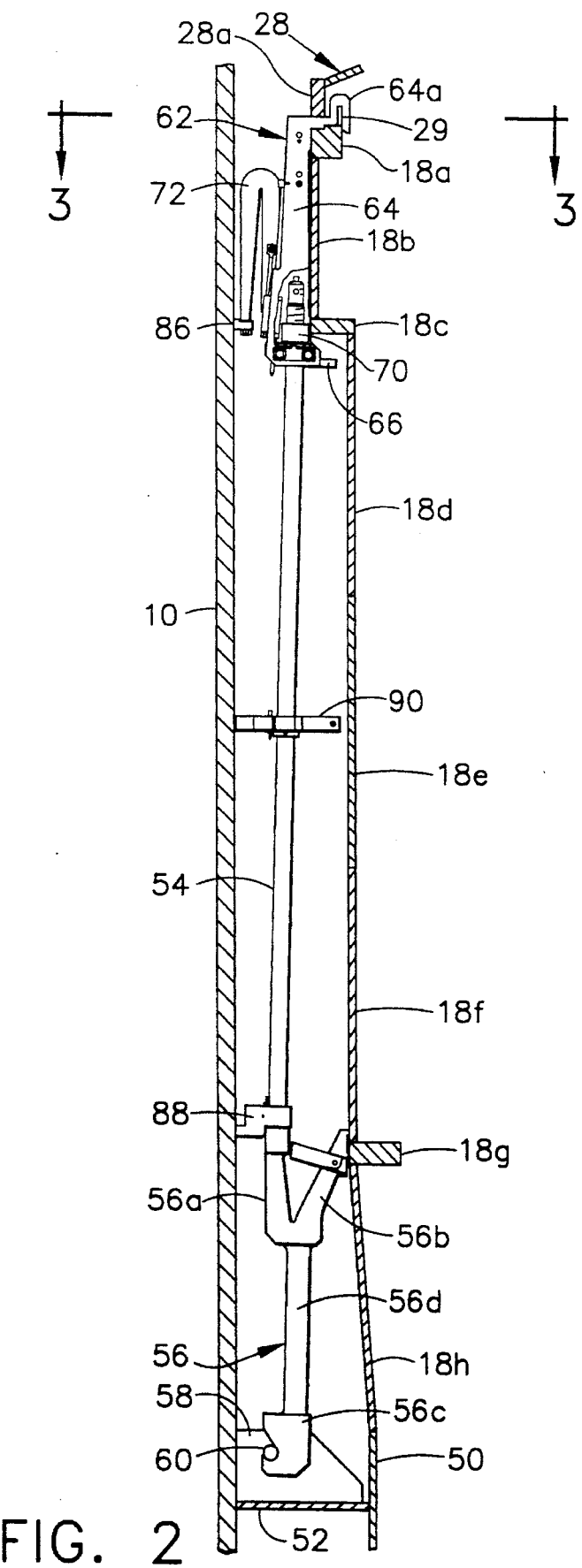
FIG. 2 is an elevation view of core shroud repair hardware comprising a tie rod assembly for vertically restraining the shroud and wishbone springs for laterally restraining the shroud at the elevations of the top guide support ring and the core plate.
Figure 3:
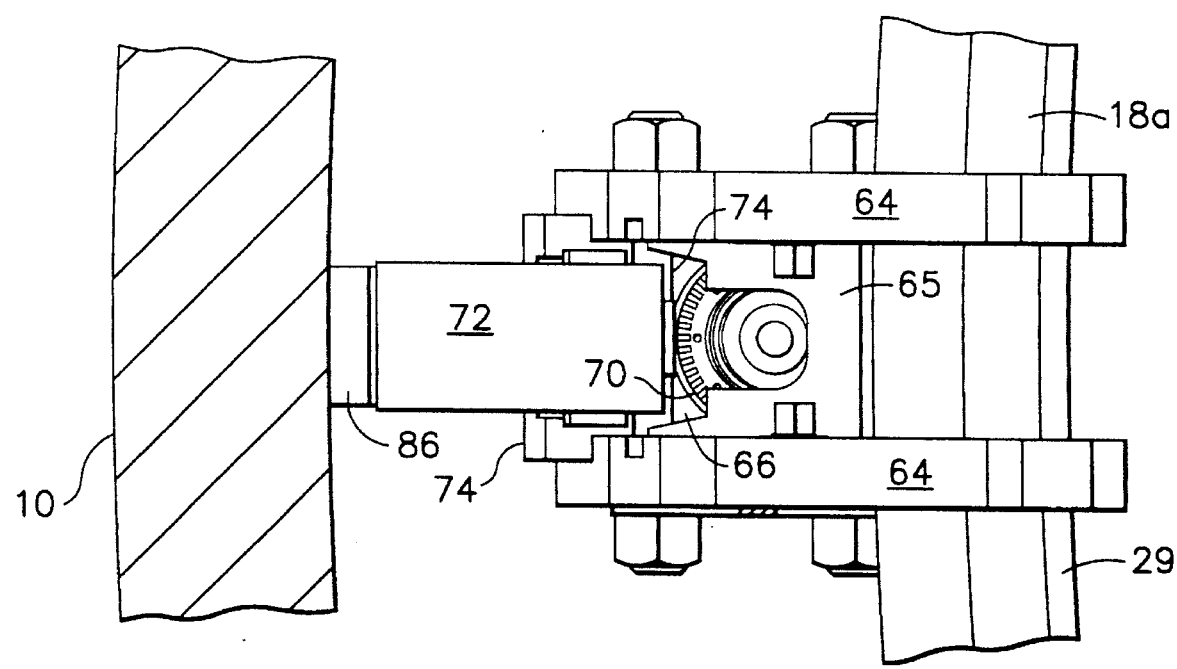
FIG. 3 is a top plan view taken along section line 3—3 seen in FIG. 2.
Figure 5:
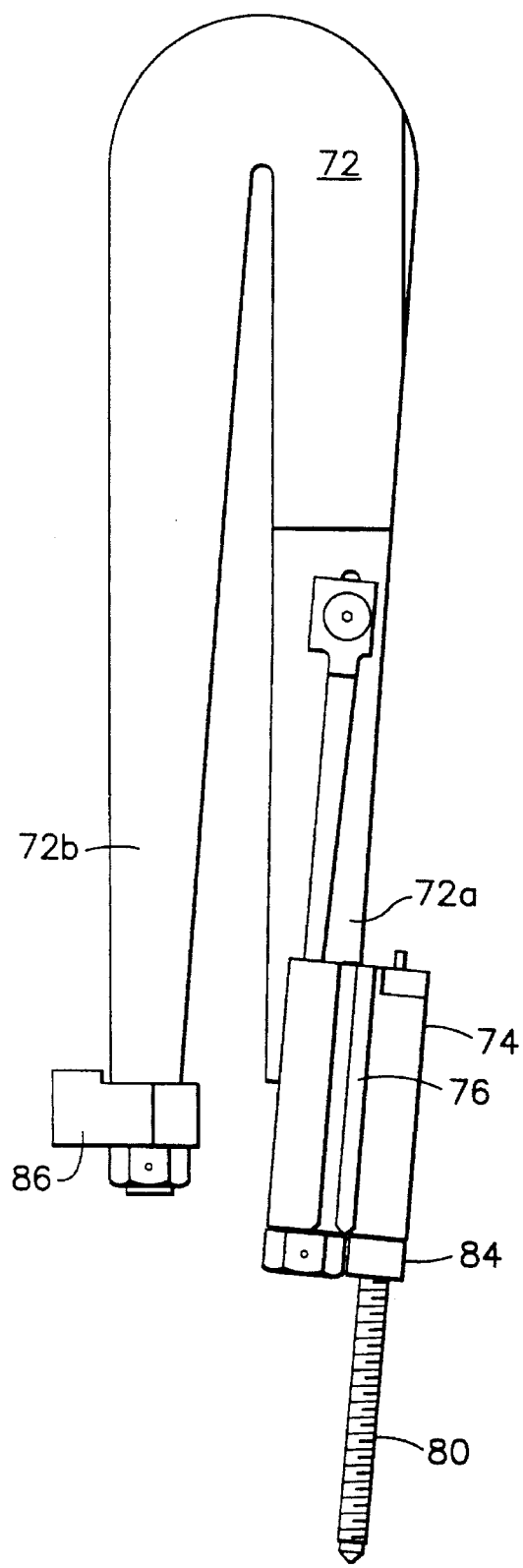
FIG. 5 is a side elevation view of the upper stabilizer assembly of the shroud repair hardware shown in FIG. 2.

The preferred embodiment of the tool in accordance with the invention is designed to measure the downcomer annulus width along a radius which intersects the location where the upper contact spacer 86 (see FIGS. 2 and 5) will contact the RPV wall. The tool provides an electrical signal corresponding to the distance traveled by a sliding assembly which is extended from a "home" position to a position at which a contact block of the sliding assembly contacts the RPV wall. The annulus width measuring tool 100 is shown in FIG. 6 in the extended position, with the contact block 118 abutting the RPV wall 10.

Figure 4:
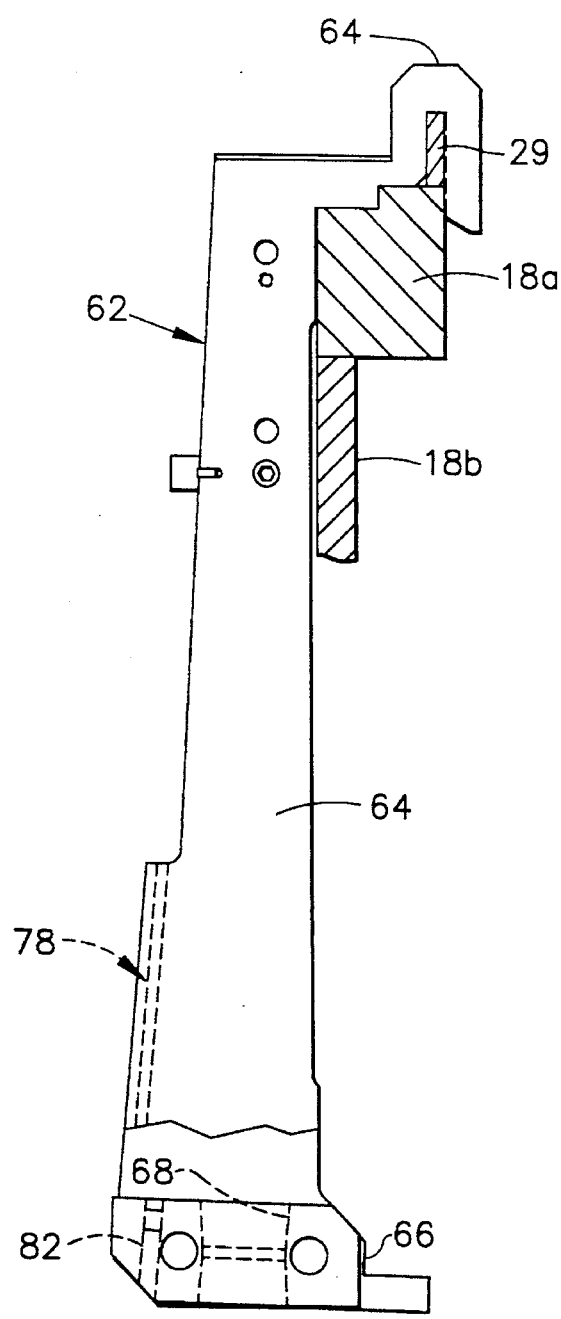
FIG. 4 is a side elevation view of the upper support assembly of the shroud repair hardware shown in FIG. 2.
Figure 6:
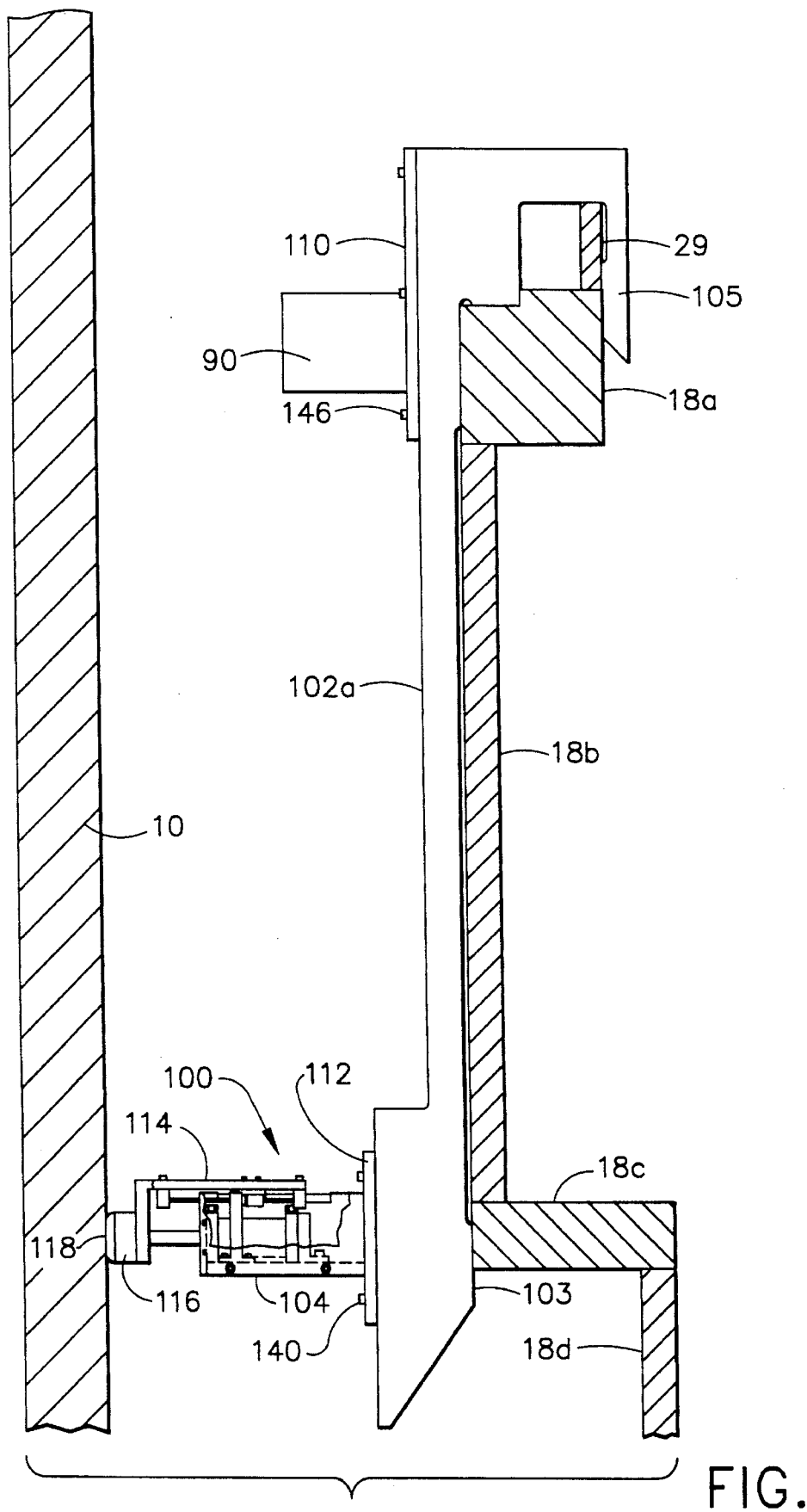
FIG. 6 is an elevation view of the uppermost portion of the downcomer annulus, showing the position of a tool for measuring the width of the annulus at the upper contact spacer elevation in accordance with the preferred embodiment of the present invention.
Figure 9B:
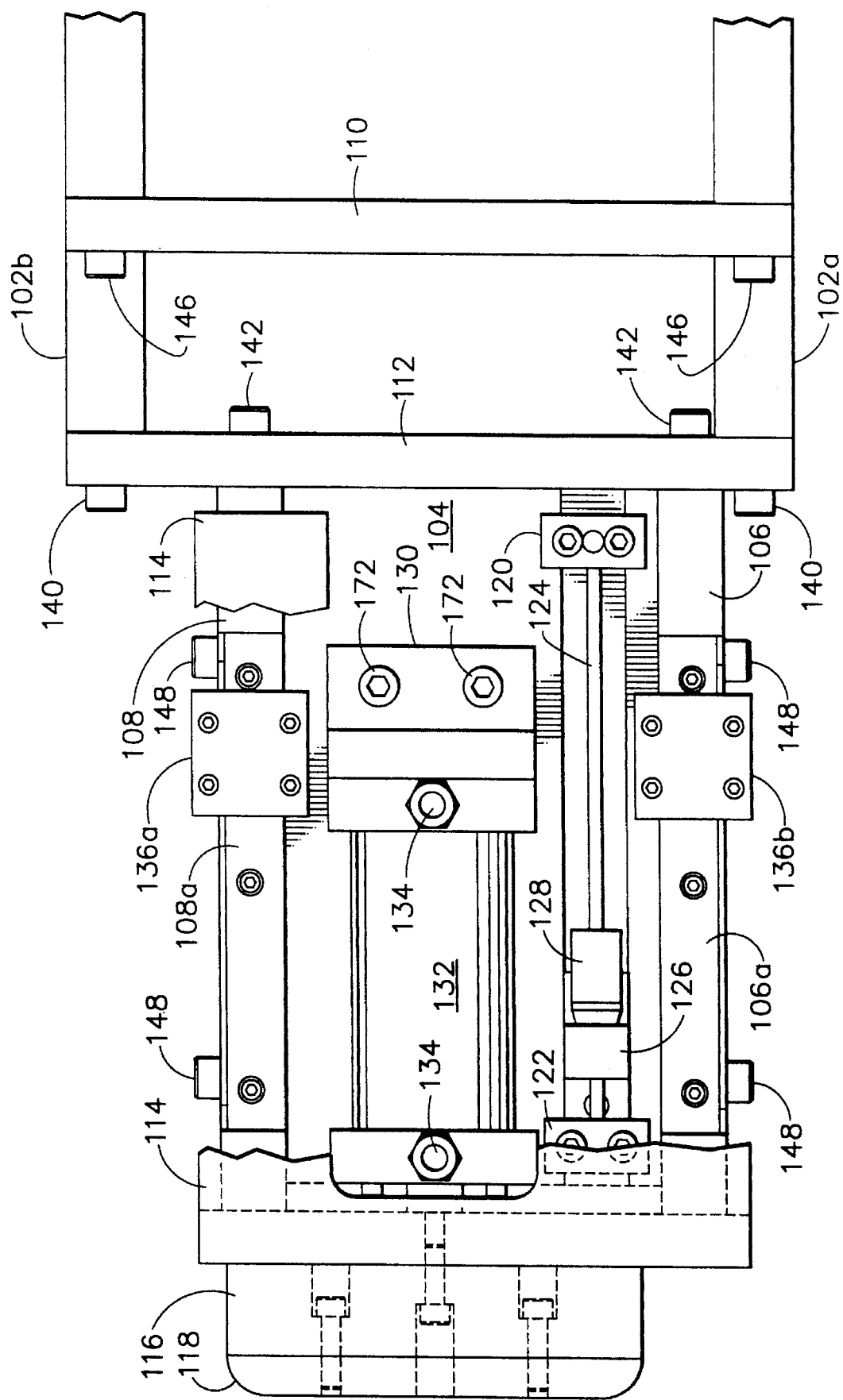
FIG. 9B is a top plan view of the lower portion of the measuring tool shown in FIG. 9A.

Referring to FIGS. 6 and 9B, the measuring tool 100 has a support frame adapted to be grappled and then hooked onto the upper rim of the shroud in a manner similar to that in which the upper support assembly 62 of the shroud repair hardware hangs on the shroud (see FIG. 4). The support frame comprises a pair of support arms 102a, 102b in the form of side plates. Each support arm 102a, 102b has a recess which conforms to the shape of the top surface of shroud flange 18a and the shape of the steam dam 29. The portion 105 of each support arm hooks on the inner circumference of shroud dam 29. The support arms 102a, 102b are maintained in a generally mutually parallel relationship by a grapple plate 110 and a mounting plate 112. Grapple plate 110 is attached to support arms 102a, 102b by a set of six socket head cap screws 146, three on a side. Mounting plate 112 is attached to support arms 102a, 102b by a set of four socket head cap screws 140, two on a side. Each support arm is configured such that a surface 103 bears against the outer circumferential surface of the top guide support ring 18c when the support frame is hung on the shroud flange (see FIG. 6).

Figure 7:
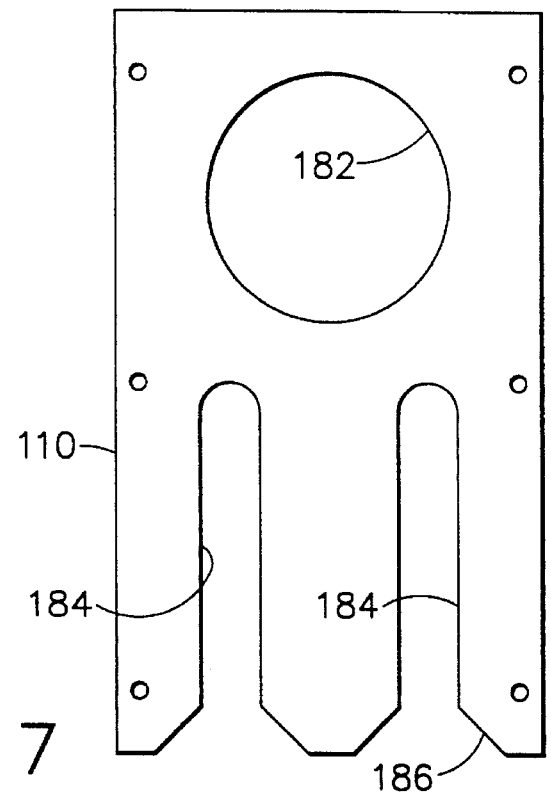
FIG. 7 is a front elevation view of the grapple plate shown in side view in FIG. 6.

Grapple plate 110, shown in more detail in FIG. 7, has a circular aperture 184 for receiving a grapple (not shown), by means of which the annulus width measuring tool is installed in and removed from its position hooked onto the shroud upper periphery. Grapple plate 110 also has a pair of slots 186 for receiving the respective arms of one of the shroud head bolt lugs 90 (see FIG. 6) circumferentially distributed on the outer periphery of the shroud flange 18a. Each slot 186 has a chamfer 188 at its mouth to guide the shroud head bolt lug into the slots 186.

AS seen in FIG. 6, grapple plate 110 and mounting plate 112 are disposed generally vertically when the annulus width measuring tool is properly installed on the shroud flange. Referring to FIGS. 9A and 9B, two generally rectangular side plates 106 and 108 are attached to the mounting plate 112 in a generally vertical position by four socket head cap screws 142. The bottom plate 104 is attached horizontally to the side plates 106,108 by four socket head cap screws 148. Bottom plate 104 has a cylinder mount 130 attached thereto by a pair of socket head cap screws 172, which cylinder mount supports a double-acting cylinder 132 (pneumatic or hydraulic) in a position such that the piston of the cylinder extends or retracts generally radially (relative to the reactor pressure vessel) depending on the direction in which the cylinder is actuated. The cylinder 132 is coupled to a pair of pressurized fluid (air or water) lines via respective male connectors 134. For the sake of convenience, the lines which connect the cylinder to a source of pressurized fluid via a control station are not shown.

Figure 8:
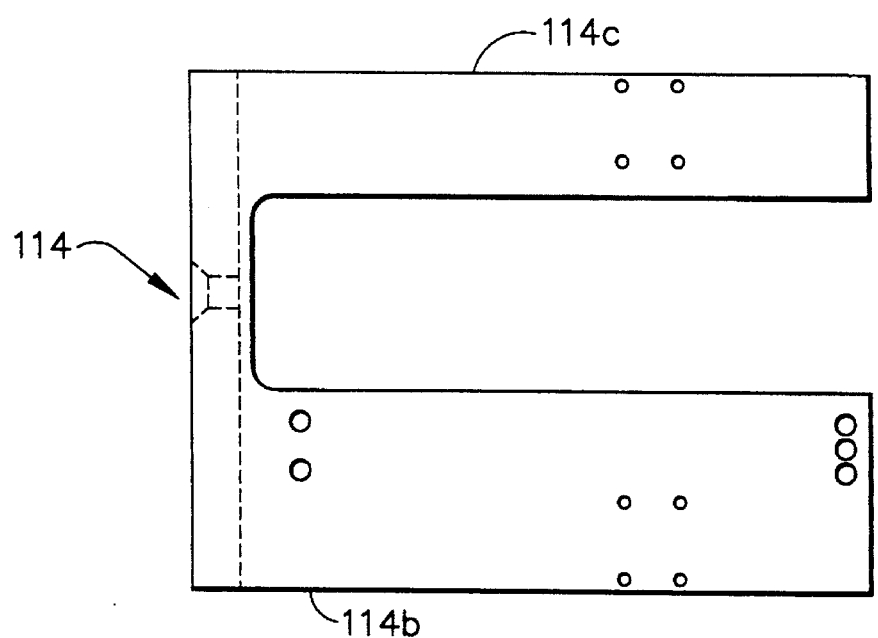
FIG. 8 is a top plan view of the slider shown in side view in FIG. 6.

The upper edge of each side plate 106, 108 has a cutout with a generally horizontal flat surface 106a, 108a. A pair of linear bearings 136a and 136b (see FIG. 9B) are respectively mounted on the flat surfaces 108a and 106a. The linear bearings 108a, 108b support a slider 114 which has a generally vertical planar portion 114a attached to the end of the piston of cylinder 132. As best seen in FIG. 8, the slider further comprises a generally horizontal planar portion 114c which connects the vertical planar portion 114a to the linear bearing 136a and a generally horizontal planar portion 114b which connects the vertical planar portion 114a to the linear bearing 136b. The linear bearings allow the slider 114 to slide relative to the support frame in response to actuation of cylinder 132. The vertical planar portion 114a of slider 114 supports an extension block 116, which in turn supports a contact block 118. Whereas the extension block 116, the slider 114 and all parts of the support frame are preferably made of aluminum alloy, the contact block 118 is preferably made of stainless steel to prevent deformation of the contact block upon impact with the reactor pressure vessel.

In response to extension of cylinder 132, slider 114 carries the contact block radially outward until the contact block is stopped by impingement against the inner surface of the reactor pressure vessel, as shown in FIG. 6. The distance separating the "home" and "stop" positions of the slider 114 is measured by a magnetic position transducer.

Figure 10:
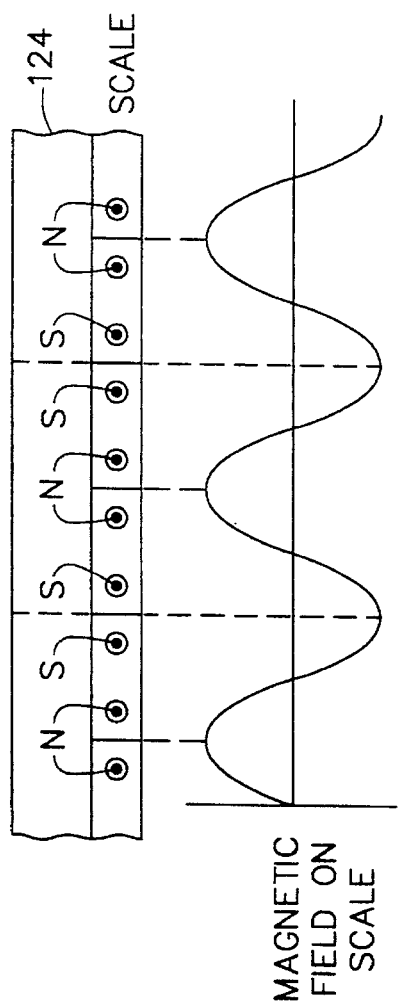
FIG. 10 is a graph showing the magnetic field versus the magnetic graduation on the scale of the magnetic position transducer incorporated in the preferred embodiment of the invention.

The magnetic position transducer produces electrical signals which are a function of the distance traveled by the slider during its excursion from the "home" position to the "stop" position. Referring to FIG. 10, the magnetic position transducer comprises a scale 124 with magnetic graduations and a head arrangement consisting of a pair of magnetic flux-responsive multi-gap heads 128a, 128b which are slidably coupled to the scale. The heads 128a, 128b produce electrical signals which are a function of the distance traveled by the scale 124 (i.e., slider) relative to the heads. Opposing ends of the scale 124 are fixedly mounted on the slider 114 by means of respective front and rear scale mounts 120 and 122 (see FIGS. 9A and 9B), which are attached to the horizontal planar portion 114b of slider 114 by respective socket head cap screws 174. The head arrangement 128 is fixedly mounted on the support frame so that the scale translates relative to the heads by a distance equal to the distance traveled by the slider. In particular, the head arrangement 128 is supported by a head mount 126 (preferably made of aluminum alloy) attached to the bottom plate 104 by a pair of socket head cap screws 176.

The scale 124 has magnetic graduations recorded at a pitch of 0.2 mm on magnetic material in the form of a rod with a circular cross section. These graduations are indicated by the magnetic pole designations N and S in FIG. 10. The scale, with magnetic pattern recorded, is housed in a shield casing, and therefore, is unaffected by any strong external magnetic field. The scale produces a sinusoidal magnetic field wave with a 0.2 mm cycle, as shown in FIG. 10. The multi-gap heads move over these magnetic graduations and transform the sinusoidally varying magnetic field into electrical signals which are a function of the relative linear displacement.

Each multi-gap head 128a, 128b is composed of a series of head elements connected in series at the pitch of half of the characteristic wavelength of the multi-gap head, the adjacent head elements being faced in opposite directions. Due to this arrangement, the multi-gap head output is the sum of the outputs of the head elements. The output characteristic of the multi-gap head features sharp wavelength selectivity. Due to this feature, the multi-gap head functions as a wave-length selection filter.

Figure 11:
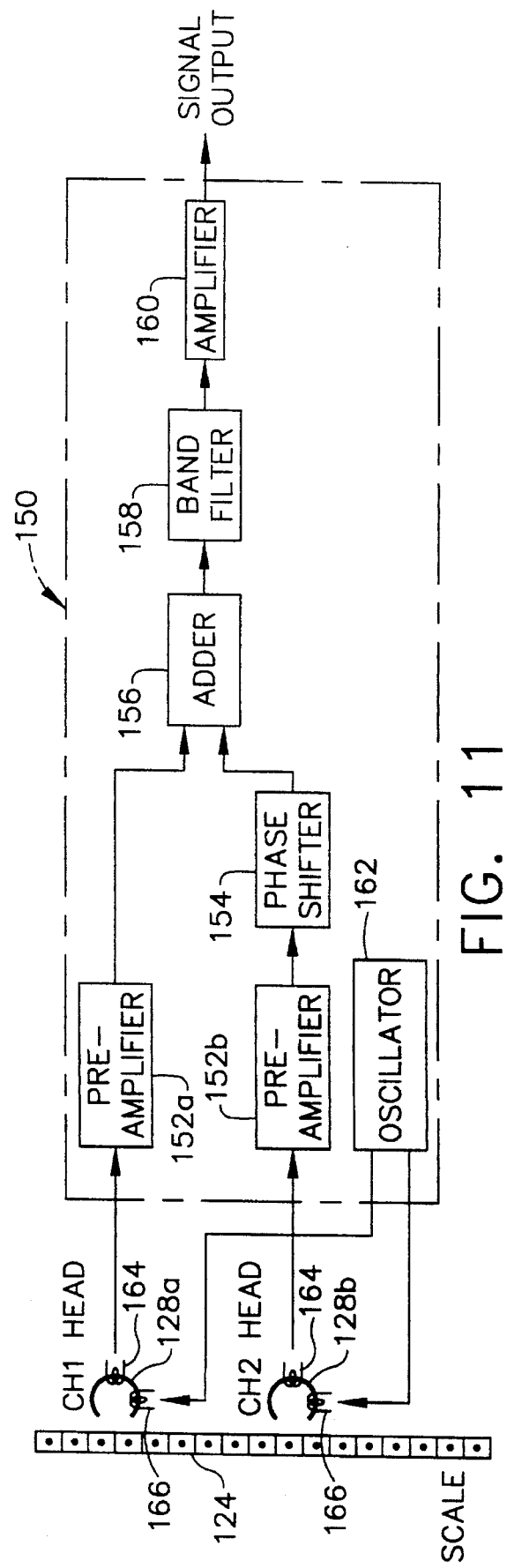
FIG. 11 is a block diagram of the phase system detector of the magnetic position transducer incorporated in the preferred embodiment of the invention, which detector transduces electrical signals from the scale and head into electrical signals suitable for measurement.

The flux-responsive head is based upon the principle of a magnetic modulator with a saturable core. Referring to FIG. 11, each head 128a, 128b has a signal sensing winding 174 and an exciter winding 166 on a saturable core. The latter is typically excited by a harmonic current of 5–25 kHz. When the magnetic flux of the scale flows to the head through a magnetic pole, the harmonic excitation magnetic flux is modulated, and the balance modulated signal, whose frequency is twice as high as that of the excitation signal, is induced on the signal sensing winding 164. As shown in FIG. 11, a pair of heads 128a, 128b are arranged with a phase difference of 90°. Due to this arrangement, the heads generate scale signals of sine and cosine waves respectively, which facilitates discrimination of scale moving direction and highly accurate interpolation.

The electrical signals from the magnetic position transducer are transduced by a phase system detector 150 to produce a signal output indicating the measured distance traveled by the slider. The phase system detector 150 includes a pre-amplifier 152a which receives the output from the Channel 1 head 128a and a pre-amplifier 152b which receives the output from the Channel 2 head 128b. The pre-amplified Channel 2 output is shifted 90° in phase by phase shifter 154 before being summed with the pre-amplified Channel 1 output in adder 156. The summed signal is a phase modulated signal having a fixed amplitude and a phase which changes with relative displacement of the scale and head. Filtering of the phase modulated signal by band filter 158 and amplification by amplifier 160 produces an output signal which is converted into a digital signal corresponding to the distance $D_2$ (see FIG. 9A) traveled by the slider. The actual distance $D_2$ is computed based on calibration of the tool derived by measuring a calibration block in a well-known manner. The computed distance $D_2$ is then added to the known distance $D_1$ separating the end face of the contact block 118 in the "home" position and the surface 103, which abuts the outer surface of the top guide support ring 18c, to arrive at the annulus width at the desired elevation.

The magnetic position transducer in accordance with commercial embodiment of the invention is a Magnescale made by Sony Magnescale Inc.

The preferred embodiment of the installation tool in accordance with the invention has been disclosed for the purpose of illustration. Variations and modifications of the disclosed structure which fall within the concept of this invention will be readily apparent to persons skilled in the art of tooling design. For example, it will be apparent that the positions of the head and scale of the magnetic position transducer can be reversed, i.e., the scale can be mounted on the support frame while the head arrangement is mounted on the slider. All such variations and modifications are intended to be encompassed by the claims set forth hereinafter.

I claim:

1. A tool for remotely measuring the width of an annulus between a shroud and a reactor pressure vessel along a radius at a desired elevation and a desired azimuthal angle, comprising:

a support frame comprising first and second side plates, each side plate having a recess with a profile which conforms at least partly to the cross-sectional profile of an uppermost portion of the shroud;

a slider slidably mounted on said support frame for sliding in a radial direction when said support frame is seated on the uppermost portion of the shroud, said slider comprising an end face;

a contact block mounted on said endface of said slider;

a cylinder mounted on said support frame, said cylinder comprising a piston which extends in said radial direction in response to the supply of pressurized fluid thereto, said slider being coupled to said piston for travel therewith; and a position transducer arranged to detect increments of distance traveled by said slider in said radial direction during extension of said piston.

2. The tool as defined in claim 1, wherein said position transducer is a magnetic transducer comprising a scale having magnetic graduations arranged along an axis and mounted on one of said slider and said support frame and a flux-responsive head mounted on the other of said slider and said support frame, said flux-responsive head being coupled to said slider to produce electrical signals having a characteristic which indicates increments of axial travel of said flux-responsive head relative to said scale.

3. The tool as defined in claim 1, wherein said cylinder is actuated by pressurized fluid.

4. The tool as defined in claim 1, further comprising first and second linear bearings which support said slider for sliding relative to said support frame.

5. The tool as defined in claim 1, wherein said support frame and said slider are made of aluminum alloy and said contact block is made of stainless steel.

6. The tool as defined in claim 1, wherein said support frame further comprises a grapple plate connected to upper portions of said first and second side plates and a mounting plate connected to lower portions of said first and second side plates, wherein said slider, said cylinder and said position transducer are supported by said mounting plate.

7. The tool as defined in claim 6, wherein said grapple plate comprises an aperture and a pair of parallel slots.

8. The tool as defined in claim 6, wherein said support frame further comprises a mounting plate attached to lower portions of said first and second side plates, a bottom plate having one end attached to said mounting plate, and a head mount attached to said bottom plate, said head being mounted on said head mount, and further comprising first and second scale mounts attached to said slider, opposing ends of said scale being mounted in said first and second scale mounts respectively.

9. A tool for remotely measuring the width of an annulus between inner and outer concentric cylindrical walls along a radius at a desired elevation and a desired azimuthal angle, comprising:

a tool support frame comprising first and second side plates having upper portions connected by a grapple plate and lower portions connected by a mounting plate, each side plate having a hook-shaped distal end shaped to hook onto a rim of the inner cylindrical wall; and a measurement subassembly mounted to said mounting plate, said measurement subassembly comprising:

first and second mutually parallel tracks;

a track support frame for supporting said first and second tracks;

first and second linear bearings coupled to said first and second tracks, respectively, for linear travel thereon;

a slider supported by said first and second linear bearings for sliding in a radial direction when said support frame is seated on the rim of the inner cylindrical wall, said slider comprising an end face;

a contact block mounted on said endface of said slider;

a cylinder mounted on said track support frame, said cylinder comprising a piston which extends in said radial direction in response to the supply of pressurized fluid thereto, said slider being coupled to said piston for travel therewith; and a position transducer arranged to detect increments of distance traveled by said slider in said radial direction during extension of said piston.

10. The tool as defined in claim 9, wherein said position transducer is a magnetic transducer comprising a scale having magnetic graduations arranged along an axis and mounted on one of said slider and said track support frame and a flux-responsive head mounted on the other of said slider and said track support frame, said flux-responsive head being coupled to said slider to produce electrical signals having a characteristic which indicates increments of axial travel of said flux-responsive head relative to said scale.

11. The tool as defined in claim 9, wherein said cylinder is actuated by pressurized fluid.

12. The tool as defined in claim 9, wherein said tool support frame, said track support frame and said slider are made of aluminum alloy and said contact block is made of a material harder than aluminum alloy.

13. The tool as defined in claim 9, wherein said grapple plate comprises an aperture and a pair of parallel slots.

14. The tool as defined in claim 10, wherein said track support frame comprises a bottom plate having one end attached to said mounting plate, further comprising a head mount attached to said bottom plate, said head being mounted on said head mount, and first and second scale mounts attached to said slider, opposing ends of said scale being mounted in said first and second scale mounts respectively.

15. A tool for remotely measuring a radial distance in an annulus between inner and outer concentric cylindrical walls at a desired elevation and a desired azimuthal angle, comprising:

a measurement subassembly support frame;

a measurement subassembly comprising a cylinder mounted on said measurement subassembly support frame and having a piston which extends in response to a supply of pressurized fluid, a slider connected to said piston, linear bearing means for supporting said slider, said linear bearing means being linearly translatable relative to said measurement subassembly support frame, a contact block mounted on said slider, and a magnetic position transducer arranged to detect increments of distance traveled by said contact block relative to said measurement subassembly support frame during extension of said piston, said magnetic position transducer comprising a scale with magnetic graduations mounted on said slider and a flux-responsive head magnetic mounted on said measurement subassembly support frame, wherein said flux-responsive head is coupled to said slider to produce electrical signals having a characteristic which indicates increments of axial travel of said flux-responsive head relative to said scale; and means for supporting said measurement subassembly support frame in a fixed position relative to the inner and outer cylindrical walls such that during extension of said piston, said contact block extends in a radial direction to contact one of the inner and outer cylindrical walls at the desired elevation and the desired azimuthal angle.

16. The tool as defined in claim 15, wherein said supporting means comprise first and second side plates having upper portions connected by a grapple plate, each side plate having a hook-shaped distal end shaped to hook onto a rim of the inner cylindrical wall and said grapple plate having an aperture for receiving a grapple.

17. The tool as defined in claim 15, wherein said cylinder is actuated by pressurized fluid.

18. The tool as defined in claim 15, wherein said measuring assembly support frame, said supporting means and said slider are made of aluminum alloy and said contact block is made of a material harder than aluminum alloy.

19. The tool as defined in claim 16, wherein said measuring assembly support frame comprises a mounting plate connected to lower portions of said first and second side plates, and first and second mutually parallel tracks supported by said mounting plate, and said linear bearing means comprise first and second linear bearings which travel along said first and second tracks respectively during extension of said piston.

20. The tool as defined in claim 15, wherein said measuring assembly further comprises an extension block which is attached to said slider and to which said contact block is attached.

* * * * *